United States Patent
Svensson et al.

(10) Patent No.: US 12,035,658 B2
(45) Date of Patent: Jul. 16, 2024

(54) SWITCHING MECHANISM FOR AN OUTDOOR ROBOTIC TOOL

(71) Applicant: Husqvarna AB, Huskvarna (SE)

(72) Inventors: Mats Svensson, Huskvarna (SE); Bilader Younadam, Jönköping (SE); Anders Hjalmarsson, Gränna (SE)

(73) Assignee: HUSQVARNA, Huskvarna (SE)

( * ) Notice: Subject to any disclaimer, the term of this patent is extended or adjusted under 35 U.S.C. 154(b) by 1301 days.

(21) Appl. No.: 16/607,804

(22) PCT Filed: Mar. 20, 2018

(86) PCT No.: PCT/SE2018/050275
§ 371 (c)(1),
(2) Date: Oct. 24, 2019

(87) PCT Pub. No.: WO2018/199823
PCT Pub. Date: Nov. 1, 2018

(65) Prior Publication Data
US 2020/0128750 A1 Apr. 30, 2020

(30) Foreign Application Priority Data
Apr. 27, 2017 (SE) .................................. 1750502-5

(51) Int. Cl.
*A01D 75/20* (2006.01)
*A01D 34/00* (2006.01)
(Continued)

(52) U.S. Cl.
CPC ........... *A01D 75/20* (2013.01); *A01D 34/824* (2013.01); *A01D 34/828* (2013.01); *H01H 3/022* (2013.01);
(Continued)

(58) Field of Classification Search
CPC .... A01D 75/006; A01D 75/20; A01D 34/008; A01D 34/828; A01D 34/824;
(Continued)

(56) References Cited

U.S. PATENT DOCUMENTS

2016/0084436 A1 3/2016 Gottinger et al.
2021/0329841 A1* 10/2021 Cuong ................. A01D 34/008

FOREIGN PATENT DOCUMENTS

CN 201260303 Y 6/2009
CN 102845186 A 1/2013
(Continued)

OTHER PUBLICATIONS

Swedish Search Report for Application No. 1750502-5 mailed Dec. 5, 2017.
International Search Report and Written Opinion for International Application No. PCT/SE2018/050275 mailed May 25, 2018.
International Preliminary Report on Patentablity for International Application No. PCT/SE2018/050275 issued Oct. 29, 2019.

*Primary Examiner* — Alicia Torres
(74) *Attorney, Agent, or Firm* — Burr & Forman LLP (57) ABSTRACT

An outdoor robotic tool (100) comprising a switching assembly (104) comprising a carry handle (106) and a stop button (108) is disclosed. The carry handle (106) and stop button (108) are connected such that the raising of the carry handle (106) results in the stop button (108) being activated and vice versa. The activation of the stop button (108) results in the outdoor robotic tool (100) being rendered inoperable in some way. A lift-indication mechanism (126) may be present, which renders the outdoor robotic tool (100) inoperable if it is lifted. Either or both of the switching assembly (104) and lift-indication mechanism (126) may be present on the outdoor robotic tool (100).

18 Claims, 5 Drawing Sheets

(51) Int. Cl.
*A01D 34/82* (2006.01)
*H01H 3/02* (2006.01)
*H01H 9/22* (2006.01)
*H01H 21/22* (2006.01)
*H01H 21/24* (2006.01)
*A01D 101/00* (2006.01)

(52) U.S. Cl.
CPC .............. *H01H 9/22* (2013.01); *H01H 21/24* (2013.01); *A01D 34/008* (2013.01); *A01D 2075/203* (2013.01); *A01D 2101/00* (2013.01)

(58) Field of Classification Search
CPC ......... A01D 2075/203; A01D 2101/00; H01H 3/022; H01H 9/22; H01H 21/24; B60L 3/02; B60L 3/04
See application file for complete search history.

(56) References Cited

FOREIGN PATENT DOCUMENTS

| | | | | |
|---|---|---|---|---|
| CN | 104521447 A | | 4/2015 | |
| CN | 205142981 U | | 4/2016 | |
| DE | 102008038199 A1 | | 3/2010 | |
| DE | 102022126759 A1 | * | 4/2023 | ........... A01D 34/008 |
| EP | 1772879 A2 | | 4/2007 | |
| EP | 2425700 A2 | | 3/2012 | |
| JP | S6027847 U | * | 2/1985 | |
| JP | 2007006918 A | * | 1/2007 | |
| WO | 2004071165 A1 | | 8/2004 | |
| WO | 2015/115954 A1 | | 8/2015 | |
| WO | 2016/087998 A2 | | 6/2016 | |
| WO | 2016/150510 A1 | | 9/2016 | |

* cited by examiner

SWITCHING MECHANISM FOR AN OUTDOOR ROBOTIC TOOL

The present invention relates to a switching mechanism for an outdoor robotic tool, in particular a robotic lawnmower. The invention also relates to an outdoor robotic tool comprising such a switching mechanism, an outdoor robotic tool including a lift-indication mechanism, and an outdoor robotic tool including both a switching mechanism and a lift-indication mechanism.

Outdoor robotic tools may include movable parts, for example cutting blades, which are sufficiently safe during normal use of the outdoor robotic tool but which may be less safe when the outdoor robotic tool is manipulated, for example by a user. In particular, lifting of an outdoor robotic tool that is designed to operate when on the ground can expose such movable parts, which could put a user in danger. It is therefore desirable to provide a mechanism by which such movable parts may be rendered inoperable during manipulation of the outdoor robotic tool.

In accordance with a first aspect of the invention, there is provided a switching mechanism for an outdoor robotic tool, comprising: a switching assembly comprising a carry handle and a stop button having activated and deactivated states and being configured to be pressed by a user, the stop button being operatively connected to the carry handle such that raising of the carry handle results in the stop button entering the activated state and depression of the carry handle results in the stop button entering the deactivated state; and a switch in communication with the stop button for switching the outdoor robotic tool between an operable state in the deactivated state of the stop button and an inoperable state in the activated state of the stop button.

The switching mechanism may therefore prevent, for instance, moving parts of the robotic tool from being operable when the outdoor robotic tool is lifted by the carry handle. This can enhance the safety of such an outdoor robotic tool. This mechanism also provides for the carry handle and stop button to each render the robotic tool inoperable whilst only requiring a single switch, which is beneficial for economies of manufacture and assembly.

The carry handle and stop button may be rigidly connected to each other. They may also pivot about a common axis. Furthermore, the carry handle and stop button may be integrally formed.

A latching mechanism may be provided for maintaining the stop button in one of the activated state or the deactivated state. The latching mechanism may also be configured to maintain the stop button in the other of the activated state or the deactivated state.

Latching the stop button in the activated state ensures that a user may not accidentally deactivate the stop button and therefore render the outdoor robotic tool operable.

The latching mechanism may include a detent and at least one indentation for receiving the detent, the receipt of the detent within the or each indentation causing latching of the latching mechanism. The latching mechanism may include two indentations, a first indentation corresponding to the activated state of the stop button and a second indentation corresponding to the deactivated state of the stop button.

The switch may be a micro switch.

The carry handle may include a stroke limitation mechanism for limiting the movement of the carry handle.

Such a mechanism may prevent damage to the switching mechanism and may provide an additional force path to allow the outdoor robotic tool to be lifted safely.

The stroke limitation mechanism may include a blocking element and an engagement element, contact between the blocking element and the engagement element defining a limit of the movement of the carry handle.

According to a second aspect of the invention, there is provided an outdoor robotic tool including a switching mechanism according to the first aspect of the invention. The outdoor robotic tool may be a robotic lawnmower.

The outdoor robotic tool may further comprise: a body portion; a lift-indication mechanism having an activated state and a deactivated state and being in communication with the body; and a switch in communication with the lift-indication mechanism for switching the outdoor robotic tool between an operable state in the deactivated state of the lift-indication mechanism and an inoperable state in the activated state of the lift-indication mechanism.

The body may comprise: a first body portion; a second body portion; and a bridging portion interconnecting the first body portion and the second body portion; in which the lift-indication mechanism is in communication with the bridging portion.

The outdoor robotic tool may also comprise any of the additional features of the third aspect of the invention.

According to a third aspect of the invention, there is provided an outdoor robotic tool comprising: a first body portion; a second body portion; a bridging portion interconnecting the first body portion and the second body portion; a lift-indication mechanism having an activated state and a deactivated state and being in communication with the bridging portion; and a switch in communication with the lift-indication mechanism for switching the outdoor robotic tool between an operable state in the deactivated state of the lift-indication mechanism and an inoperable state in the activated state of the lift-indication mechanism.

The lift-indication mechanism renders the outdoor robotic tool inoperable when the outdoor robotic tool is lifted by its bridging portion. Therefore, the tool may be lifted safely or with reduced chance of harm to the user.

The outdoor robotic tool may further comprise at least one of a stop button configured to be pressed by a user, and a carry handle. At least one of, and optionally both of said at least one of a stop button and a carry handle may be operably connected to said switch.

The lift-indication mechanism may include a movable member, the movable member being movable relative to the bridging portion to enable a switching between the operable state and the inoperable state.

The movable member may be pivotable about a rotation axis, which may be located towards one end of the bridging portion.

The movable member may include a U-shaped element.

The U-shaped element may allow the movable member to be positioned under a large proportion of the bridging portion whilst still providing clear space under the carry handle, if a carry handle is provided.

The lift-indication mechanism may include a biasing element for biasing the lift-indication mechanism into the deactivated state. Sticking of the lift-indication mechanism can therefore be prevented or limited.

The lift-indication mechanism may act upon a switching mechanism according to the first aspect of the invention.

An embodiment of the present invention will now be described with reference to the accompanying drawings, in which.

Figure 1:
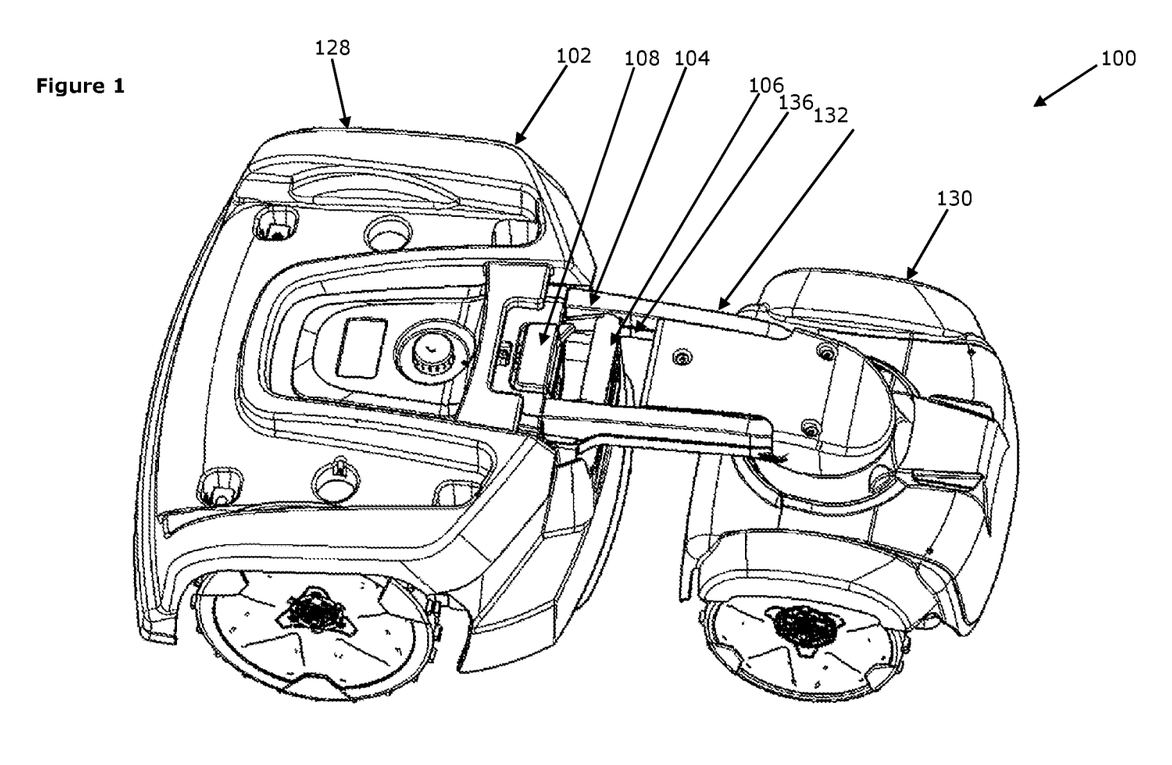
FIG. 1 is a perspective view of an outdoor robotic tool, specifically a robotic lawnmower, including a switching mechanism in accordance with the present invention.

Referring firstly to FIG. 1, there is shown an outdoor robotic tool, specifically a robotic lawnmower 100, including a housing 102 and an embodiment of a switching mechanism 104. The switching mechanism 104 is operable to stop and/or start at least one operating characteristic of the robotic lawnmower 100. For example, the operating characteristic could be the operation of a cutter blade, wheels, or both the cutter blade and wheels. Other uses for the switching mechanism 104 will be apparent to the skilled person.

Figure 2A:
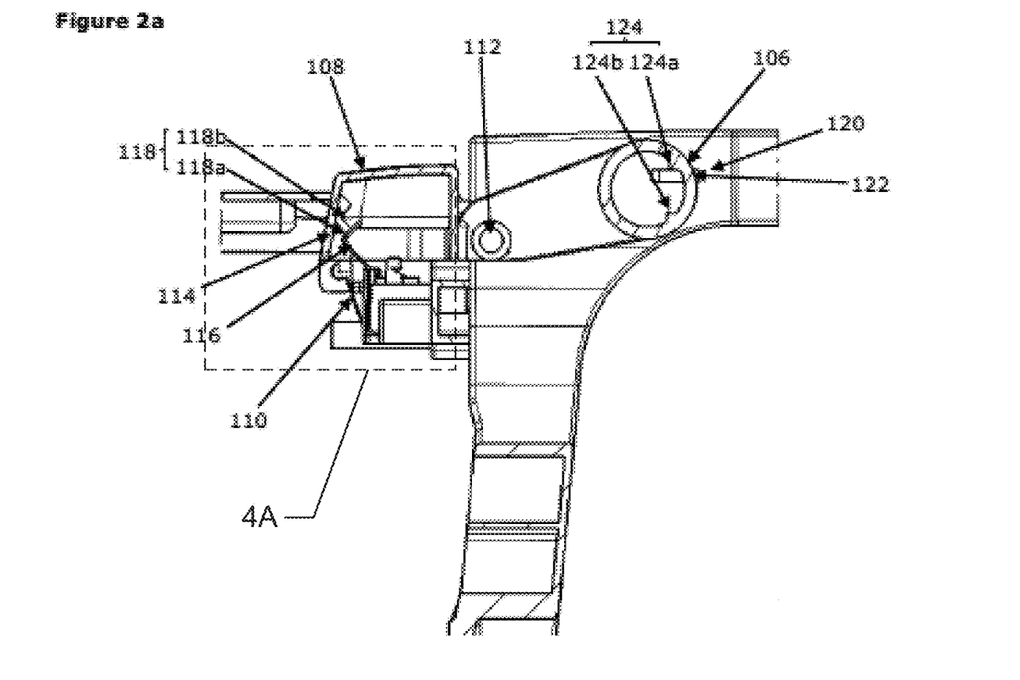
FIG. 2a is a cross-sectional view of the switching mechanism of FIG. 1 in the start position.
Figure 2B:
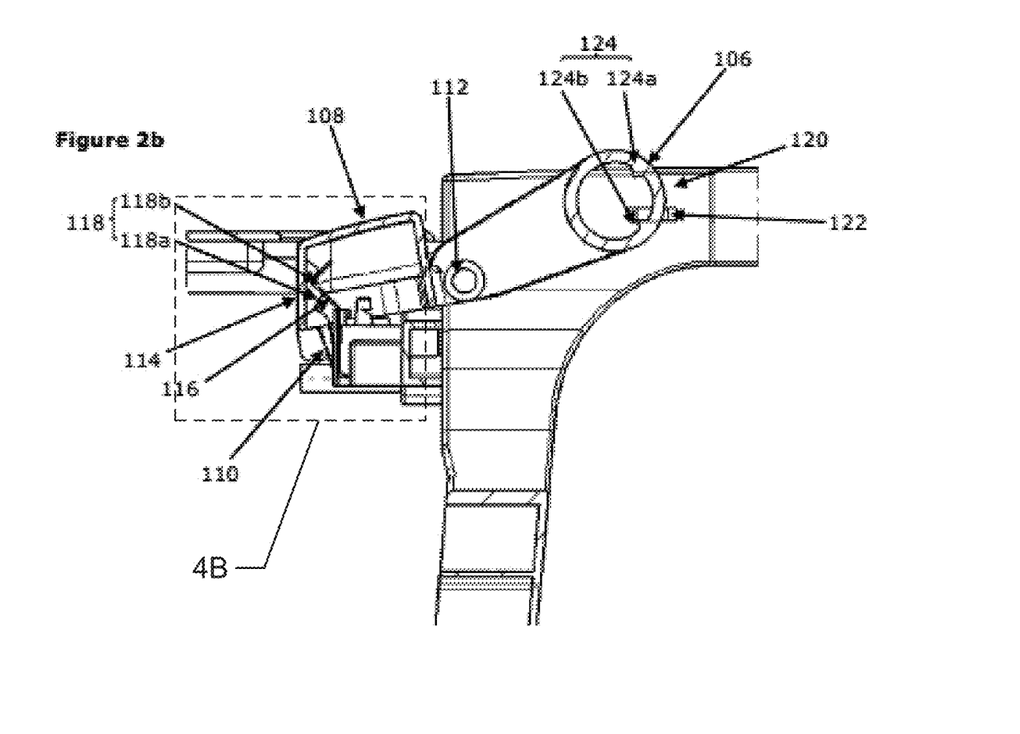
FIG. 2b is a cross-sectional view of the switching mechanism of FIG. 1 in the stop position.

The switching mechanism 104 is shown in more detail in FIGS. 2a and 2b. The switching mechanism 104 includes a carry handle 106 and a stop button 108. The mechanism is configured such that placing the stop button 108 in an activated state, corresponding to depression of the stop button 108 in this embodiment, causes the operating characteristic to switch from an operable state to an inoperable state. As such, when a user wishes to switch the robotic lawnmower 100 to an inoperable state, the stop button 108 may be depressed.

The carry handle 106 is configured such that the raising of the carry handle 106 automatically results in the stop button 108 being placed in the deactivated state, resulting in the same switch from operable state to inoperable state. Although a carry handle 106 is described here and throughout the description, if no such carry handle is required than a second button or other actuatable element could be substituted for the carry handle 106. However, an advantage of the carry handle 106 is that the act of picking up the robotic lawnmower by the carry handle 106 results in the robotic lawnmower 100 becoming inoperable, providing enhanced safety for the user. In the present embodiment, for example, the inoperable state renders both the cutting element (not shown) and the wheels inoperable.

The structure of the present embodiment allows the depression of the carry handle 106 to result in the stop button 108 being placed in a deactivated state, corresponding to a raising of the stop button 108 in the present embodiment, which switches the robotic lawnmower 100 back to the operable state. Thus, when the user requires the robotic lawnmower 100 to begin operation, the carry handle 106 can be depressed.

In order that the carry handle 106 and stop button 108 interact to switch the robotic lawnmower between operable and inoperable states, the carry handle 106 and stop button 108 are connected together such that movement of one results in movement of the other. In this way, it is possible for the switch between operable and inoperable states to be activated by a single switch, in this case a micro switch 110. The micro switch 110 of the present embodiment is actuated by the movement of the stop button 108 but could also be actuated by any other moving part of the switching mechanism 104.

In the present embodiment, the carry handle 106 and stop button 108 are rigidly interconnected and configured to rotate about a common pivot point 112 fixed relative to the housing 102 and located between the carry handle 106 and the stop button 108. Thus, the raising of the carry handle 106 results in depression of the stop button 108 and the depression of the carry handle 106 results in raising of the stop button 108. Depression and raising of the stop button 108 also results in the raising and depression of the carry handle 106, respectively. The stop button 108 and carry handle 106 are integrally formed, in the present embodiment.

Although described as integrally formed and pivotable about a pivot point 112, other modes of operation which result in the same result may also be used. For example, the carry handle 106 and stop button 108 may be formed separately and interlinked by rods, cables, pulleys, or other such linkages in order to provide the desired movement. The movement need not be pivotable, and could instead be in linear or otherwise, although pivotable movement is preferred.

A latching mechanism 114 is included which latches the stop button 108 in its activated state. Advantageously, the latching mechanism 114 of the present invention also latches the stop button 108 in its deactivated state. The latching mechanism 114 includes a detent 116 that resiliently engages with a series of two indentations 118, the indentations 118 moving with the stop button 108. Thus, as the stop button 108 is depressed, the detent 116 disengages from a lower indentation 118a and engages with an upper indentation 118b. The detent 116 of the present embodiment is attached to the micro switch 110 and therefore movement of the detent 116 from one indentation 118 to the other activates the micro switch 110.

In order to provide limitations to the extent of the movement of the switching mechanism 104, a stroke limitation mechanism 120 is provided. The stroke limitation mechanism 120 hereby limits the movement of the carry handle 106. This may prevent damage to the switching mechanism 104 but may also provide an additional force path when lifting the robotic lawnmower 100 using the carry handle 106. This force path may prevent or limit forces passing through the pivot point 112 of the switching mechanism 104.

The stroke limitation mechanism 120 of the present embodiment includes a blocking element 122 and two engagement elements 124. The blocking element 122 is fixed relative to the housing 102 and each engagement element 124 is fixed relative to the carry handle 106. An upper engagement element 124a abuts the blocking element 122 when the carry handle 106 is in its depressed position and a lower engagement element 124b abuts the blocking element 122 when the carry handle 106 is in its raised position. Due to the engagement elements 124 abutting the blocking element 122 at the two extremes of the movement of the carry handle 106, no movement in excess of that for which the carry handle 106 is designed is possible. In addition, the lower engagement element 124b also provides the additional force path when lifting the robotic lawnmower 100.

In the present embodiment, the stroke limitation mechanism 120 and latching mechanism 114 are co-designed such that the engagement of the detent 116 with the indentations 118 coincides with the abutting of the engagement elements 124 with the blocking element 122.

Figure 3A:
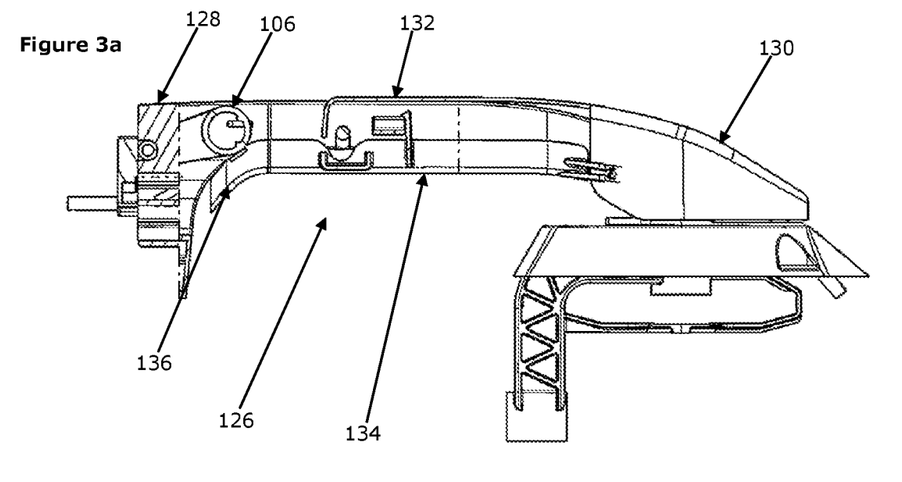
FIG. 3a is a cross-sectional view of the bridging portion of the outdoor robotic tool of FIG. 1, including lift-indication mechanism in the deactivated state.
Figure 3B:
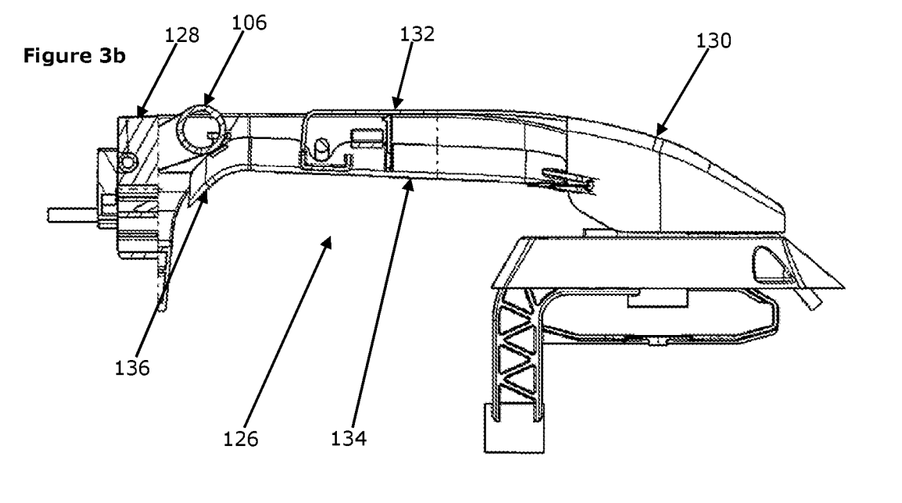
FIG. 3b cross-sectional view of the bridging portion of the outdoor robotic tool of FIG. 1, including lift-indication mechanism in the activated state.
Figure 4A:
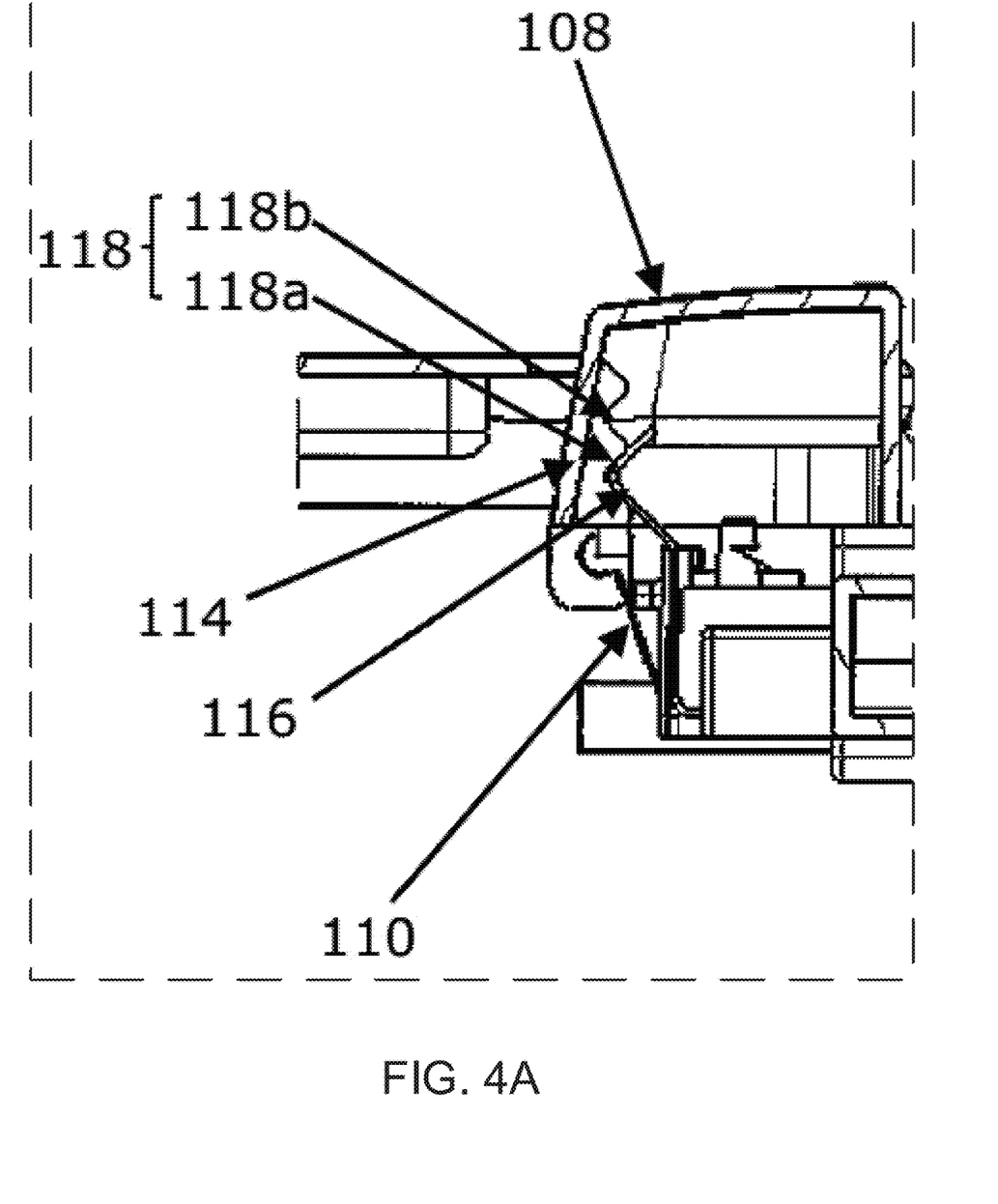
FIG. 4a illustrates a close up perspective view of the cross-sectional view of the switching mechanism of FIG. 1 in the start position taken from box 4A in FIG. 2a in accordance with an example embodiment.
Figure 4B:
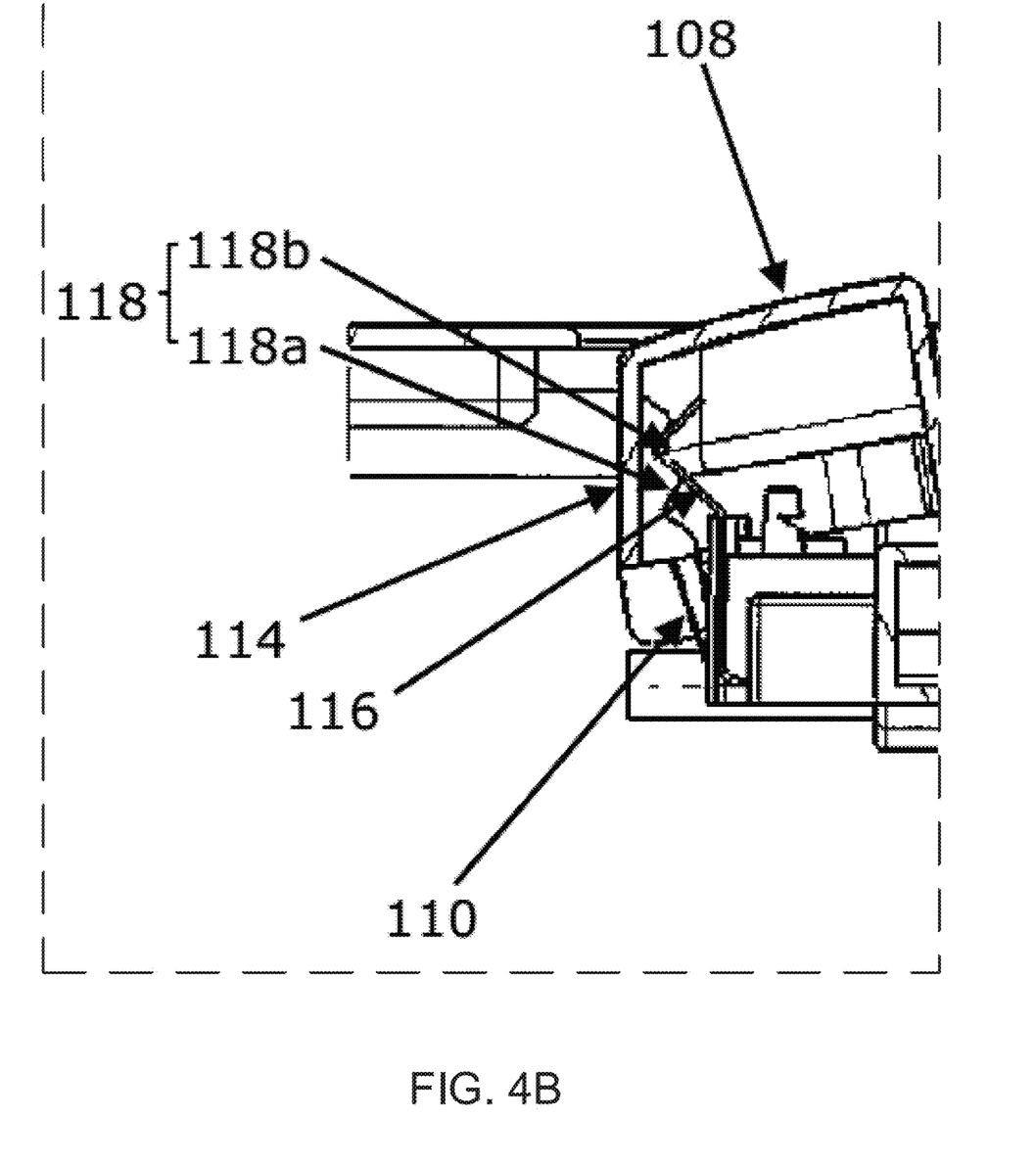
FIG. 4b illustrates a close up perspective view of the cross-sectional view of the switching mechanism of FIG. 1 in the stop position taken from box 4B in FIG. 2b in accordance with an example embodiment.

The robotic lawnmower 100 also includes a lift-indication mechanism 126. The housing 102 of the robotic lawnmower 100 includes a first body portion 128 and a second body portion 130, which are interconnected by a bridging portion 132. The lift-indication mechanism 126 has an activated state and a deactivated state and includes, in the present embodiment, a movable member 134 that is pivotably connected to the bridging portion 132 such that the movable member 134 is positioned on an underside of the bridging portion 132. The pivoting of the movable member 134 switches the lift-indication mechanism 126 between the activated state and the deactivated state. Thus, if a user were to lift the robotic lawnmower 100 by way of the bridging portion 132, this act would cause the pivoting of the lift-indication mechanism 126 towards the bridging portion 132, switching the lift-indication mechanism 126 into the activated state. Release of the movable member 134, for example when the user releases the robotic lawnmower 100, allows the lift-indication mechanism 126 to switch back to the deactivated state.

The lift-indication mechanism 126 is in communication with the micro switch 110 such that when the lift-indication mechanism 126 is in the activated state the micro switch 110 causes the robotic lawnmower 100 to switch to the inoperable state. Although, in this case, the micro switch 110 is the same as that which is operated by the switching mechanism 104, a separate switch may be provided, although this is disadvantageous due to the necessity of including further additional electronic components.

In the present embodiment, the bridging member is pivotably connected to the second body portion about a substantially vertical axis. This pivoting connection allows the second body portion to twist relative to the bridging member and the first body portion, enabling steering of the robotic tool. Of course, the pivoting connection may be between the bridging portion and the first body portion, alternatively or in addition to a pivoting connection between the bridging portion and the second body portion.

The present embodiment of the lift-indication mechanism 126 interacts with the switching mechanism 104 in order that only the single micro switch 110 is required. When pivoted, the movable member 134 acts upon the carry handle 106 in order to raise the carry handle 106. As described earlier, the raising of the carry handle 106 operates the micro switch 110, switching the robotic lawnmower 110 into the inoperable state. The movable member 134 directly acts upon the carry handle 106, in the present embodiment, although additional components or a further mechanism could be included, if required. The movable member 134 includes, in the present embodiment, a U-shaped member 136, which extends along either side of the bridging portion 132 and joins under the carry handle 106. It is therefore the curve of the U-shaped member 136 that acts upon the carry handle 106.

As can be seen in FIG. 3a, which depicts the bridging portion 132 of the robotic lawnmower 100, the movable member 134 is in its rest position and as such the lift-indication mechanism 126 is in its deactivated state. In FIG. 3b, the movable member 134 has been pivoted about a rotation axis located toward one end of the bridging portion by a force being provided to lift the robotic lawnmower 100. The pivoting of the movable member 134 has resulted in the raising of the carry handle 106. Thus, the lift-indication mechanism 126 being moved into its activated state results in the stop button 108 also being moved into its activated state. A single micro switch 110 can therefore provide the switching for both mechanisms. It will be apparent to the skilled person that, where it is desirable to provide separate switches for each mechanism, the lift-indication mechanism 1226 and switching mechanism 104 need not interact in this manner, although it is preferable, for reasons of economy.

When released, the movable member 134 may fall back to its rest position naturally, for instance through the action of gravity. Alternatively, a biasing element may be provided to ensure that sticking of the lift-indication mechanism 126 does not occur. Although not shown in the present embodiment, the biasing element may, for example, include a spring.

Although described in the present description as being in the same embodiment, the switching mechanism 104 and lift-indication mechanism 126 may operate independently of each other and each may also be present in the absence of the other. Therefore, one embodiment of a robotic lawnmower 100 may include the switching mechanism 104 without the lift-indication mechanism 126 and another embodiment of the robotic lawnmower 100 may include the lift-indication mechanism 126 without the switching mechanism 104. The two mechanisms each include the ability to place the robotic lawnmower 100 in the inoperable state when lifted, with each detecting lifting from a different point on the machine. It is clearly desirable to include both mechanisms, but this is not always necessary.

The invention claimed is:

1. A switching mechanism for an outdoor robotic tool, the switching mechanism comprising:
   a switching assembly comprising a carry handle and a stop button having activated and deactivated states and being configured to be pressed by a user, the stop button being operatively connected to the carry handle such that raising of the carry handle results in the stop button entering the activated state and depression of the carry handle results in the stop button entering the deactivated state; and
   a switch in communication with the stop button for switching the outdoor robotic tool between an operable state in the deactivated state of the stop button and an inoperable state in the activated state of the stop button, wherein the carry handle and stop button each pivot about a common pivot axis.

2. A switching mechanism according to claim 1, wherein the carry handle and stop button are rigidly connected to each other.

3. A switching mechanism according to claim 1, wherein the carry handle and stop button are integrally formed.

4. A switching mechanism according to claim 1, further comprising a latching mechanism for maintaining the stop button in one of the activated state or the deactivated state.

5. A switching mechanism according to claim 4, wherein the latching mechanism is also configured to maintain the stop button in the other of the activated state or the deactivated state.

6. A switching mechanism according to claim 5, wherein the latching mechanism includes a detent and at least one indentation for receiving the detent, the receipt of the detent within the or each indentation causing latching of the latching mechanism.

7. A switching mechanism according to claim 6, wherein the latching mechanism includes two indentations, a first indentation corresponding to the activated state of the stop button and a second indentation corresponding to the deactivated state of the stop button.

8. A switching mechanism according to claim 1, wherein the switch is a micro switch.

9. A switching mechanism according to claim 1, wherein the carry handle includes a stroke limitation mechanism for limiting the movement of the carry handle.

10. A switching mechanism according to claim 9, wherein the stroke limitation mechanism includes a blocking element and an engagement element, contact between the blocking element and the engagement element defining a limit of the movement of the carry handle.

11. An outdoor robotic tool including a switching mechanism, the switching mechanism comprising:
   a switching assembly comprising a carry handle and a stop button having activated and deactivated states and being configured to be pressed by a user, the stop button being operatively connected to the carry handle such that raising of the carry handle results in the stop button entering the activated state and depression of the carry handle results in the stop button entering the deactivated state; and
   a switch in communication with the stop button for switching the outdoor robotic tool between an operable state in the deactivated state of the stop button and an inoperable state in the activated state of the stop button,
   wherein the carry handle and stop button each pivot about a common pivot axis.

12. An outdoor robotic tool according to claim 11, wherein the outdoor robotic tool is a robotic lawnmower.

13. An outdoor robotic tool according to claim 11, wherein the outdoor robotic tool further comprises:
   a body;
   a lift-indication mechanism having an activated state and a deactivated state and being in communication with the body; and
   the switch in communication with the lift-indication mechanism for switching the outdoor robotic tool between an operable state in the deactivated state of the lift-indication mechanism and an inoperable state in the activated state of the lift-indication mechanism.

14. The outdoor robotic tool according to claim 13, in which the body comprises:
   a first body portion;
   a second body portion; and
   a bridging portion interconnecting the first body portion and the second body portion;
   in which the lift-indication mechanism is in communication with the bridging portion.

15. An outdoor robotic tool comprising:
   a first body portion,
   a second body portion,
   a bridging portion interconnecting the first body portion and the second body portion, a lift-indication mechanism having an activated state and a deactivated state and being in communication with the bridging portion,
   a switch in communication with the lift-indication mechanism for switching the outdoor robotic tool between an operable state in the deactivated state of the lift-indication mechanism and an inoperable state in the activated state of the lift-indication mechanism, and
   at least one of a stop button configured to be pressed by a user and a carry handle,
   wherein at least one of said at least one of a stop button and a carry handle is operably connected to said switch.

16. An outdoor robotic tool according to claim 15, wherein the lift-indication mechanism includes a movable member, the movable member being movable relative to the bridging portion to enable switching between the operable state and the inoperable state.

17. An outdoor robotic tool according to claim 16, wherein the movable member is pivotable about a rotation axis.

18. An outdoor robotic tool according to claim 17, wherein the rotation axis is located towards one end of the bridging portion,
   wherein the movable member includes a U-shaped element, and
   wherein the lift-indication mechanism includes a biasing element for biasing the lift-indication mechanism into the deactivated state.

* * * * *

UNITED STATES PATENT AND TRADEMARK OFFICE
CERTIFICATE OF CORRECTION

| | | |
|---|---|---|
| PATENT NO. | : 12,035,658 B2 | Page 1 of 1 |
| APPLICATION NO. | : 16/607804 | |
| DATED | : July 16, 2024 | |
| INVENTOR(S) | : Mats Svensson et al. | |

It is certified that error appears in the above-identified patent and that said Letters Patent is hereby corrected as shown below:

On the Title Page

In Item (73), the Assignee, "HUSQVARNA" should read -- HUSQVARNA AB --

Signed and Sealed this
Twenty-sixth Day of November, 2024

Katherine Kelly Vidal
*Director of the United States Patent and Trademark Office*